United States Patent [19]

Higashihara et al.

[11] Patent Number: 5,228,185
[45] Date of Patent: Jul. 20, 1993

[54] METHOD OF MANUFACTURING A MAGNETIC HEAD

[75] Inventors: Ryuzo Higashihara, Kumamoto; Tomotaka Minami, Tamana; Shingo Yamashita, Yamaga, all of Japan

[73] Assignee: Matsushita Electric Industrial Co., Ltd., Osaka, Japan

[21] Appl. No.: 987,567

[22] Filed: Dec. 8, 1992

Related U.S. Application Data

[63] Continuation of Ser. No. 759,755, Sep. 12, 1991, abandoned, which is a continuation of Ser. No. 333,094, Apr. 4, 1989, abandoned.

[30] Foreign Application Priority Data

Apr. 5, 1988 [JP] Japan ................................ 63-83333

[51] Int. Cl.$^5$ .............................................. G11B 5/42
[52] U.S. Cl. ...................................... 29/603; 360/119; 427/129; 427/307
[58] Field of Search ................... 29/603; 427/129, 307; 360/119-121, 125-127

[56] References Cited

U.S. PATENT DOCUMENTS 4,656,547 4/1987 Kumasaka et al. .................. 360/126
4,769,898 9/1988 Ono et al. ............................. 29/603

FOREIGN PATENT DOCUMENTS 173208 7/1988 Japan .................................. 360/119

Primary Examiner—Carl E. Hall
Attorney, Agent, or Firm—Wenderoth, Lind & Ponack

[57] ABSTRACT

A method of manufacturing a magnetic head which includes a first step of roughening one surface of a core block formed by a polycrystalline magnetic material, a second step of forming a first core member by forming a metallic magnetic film on the one surface, and a third step of joining two core members, at least one of which is the first core member, through a non-magnetic material, so as to form a magnetic gap between them.

6 Claims, 5 Drawing Sheets

METHOD OF MANUFACTURING A MAGNETIC HEAD

This application is a continuation of now abandoned application Ser. No. 07/759,755 filed on Sep. 12, 1991, which is a continuation application of now abandoned application Ser. No. 07/333,094 filed on Apr. 4, 1989.

BACKGROUND OF THE INVENTION

The present invention generally relates to a magnetic head, and more particularly, to a method of manufacturing a magnetic head for use in a magnetic recording and reproducing apparatus for reading data from a magnetic recording medium or writing data thereinto.

In the field of a magnetic recording and reproducing apparatus widely utilized for preservation of images and data, etc., there has recently been made marked progress for compact size and high density thereof. In order to achieve the smaller size and higher density in the construction of the apparatus, various improvements have been made on the magnetic recording medium and magnetic head employed therein. More specifically, in the magnetic recording medium, techniques for high coercive force and thin film formation have been advanced, and a thin film magnetic recording medium prepared by processing a ferromagnetic metallic material such as Co-Ni or the like through vacuum thin film technique, for example, sputtering, etc., and a metal-coated magnetic recording medium applied with ferromagnetic metallic particles such as Fe, Co, Ni, etc., are proposed for actual applications. These magnetic recording mediums have high coercive force two to four times that of a conventional recording medium applied with oxide such as Fe or the like, and make it possible to record or reproduce signals at high frequency regions. Meanwhile, with respect to the magnetic head, in order to achieve saturated recording of the magnetic recording medium having a high coercive force, there has been proposed a technique for forming portions in the vicinity of a magnetic gap of the magnetic head by a metallic magnetic material having a high saturation magnetic flux density.

In FIG. 10, there is shown one example of a conventional magnetic head which includes a set of magnetic cores 1 made of an oxide magnetic material, and metallic magnetic films 2 formed on opposed faces of the magnetic cores 1 by sputtering of an Fe-Al-Si alloy having a high saturation magnetic flux density or an amorphous magnetic material, etc., through a magnetic gap 3. In the magnetic cores 1, restricting grooves 4 are formed so as to restrict a width of the magnetic gap 3, with a glass material being filled in the restricting groove 4.

Another example of a conventional magnetic head shown in FIG. 11 also includes a set of magnetic cores 1B, and metallic magnetic films 2B formed on the opposed faces of the magnetic cores 1B through a magnetic gap 3B. The magnetic cores 1B are formed with restricting grooves 4B filled with a glass material in the similar manner as in the example of FIG. 10. In this example of FIG. 11, the joint portions of the metallic films 2B and the magnetic cores 1B are formed to be non-parallel with respect to the magnetic gap 3B.

In the known arrangement of FIG. 10 as described above, however, since the joint portions between the magnetic cores 1 and the metallic magnetic films 2 undesirably function as a pseudo gap, a pseudo signal noise due to the pseudo gap is produced during the recording and reproduction. For preventing generation of such pseudo gap, the joint portions of the metallic magnetic films and the magnetic cores are arranged to be non-parallel with the magnetic gap, thereby to suppress formation of the pseudo gap as in the conventional arrangement of FIG. 11. However, such a particular construction requires a complicated processing, thus resulting in deterioration in the mass-productivity.

SUMMARY OF THE INVENTION

Accordingly, an essential object of the present invention is to provide a method of manufacturing a magnetic head which is free from generating a pseudo signal noise during recording and reproducing, and is also superior in mass-productivity.

Another object of the present invention is to provide a magnetic head of the above described type which is simple in construction and accurate in functioning.

In accomplishing these and other objects, according to one preferred embodiment of the present invention, there are provided a method of manufacturing a magnetic head which comprises a first step of roughening one surface of a core block formed by a polycrystalline magnetic material, a second step of forming a first core member by forming a metallic magnetic film on said one surface, and a third step of joining two core members, at least one of which is said first core member, through a non-magnetic material, thereby forming a metallic gap therebetween, and a magnetic head manufactured by the method.

By the steps of the present invention as described above, an improved method of manufacturing a magnetic head free from generation of a pseudo signal noise has been advantageously presented, without deteriorating the massproductivity.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
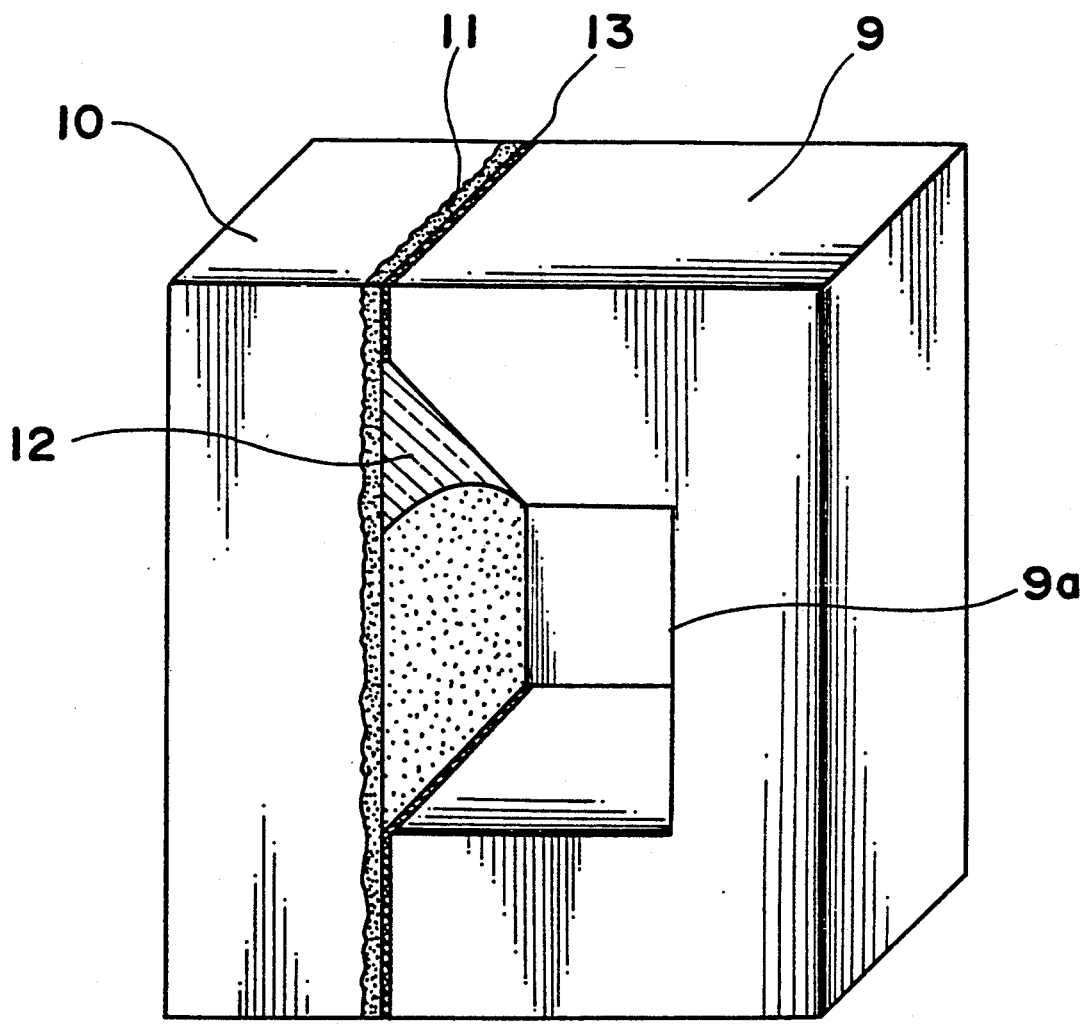
FIG. 1 is a perspective view showing a magnetic head according to one preferred embodiment of the present invention.

Before the description of the present invention proceeds, it is to be noted that like parts are designated by like reference numerals throughout the accompanying drawings.

Referring now to the drawings, there is schematically shown in FIG. 1 a magnetic head according to one preferred embodiment of the present invention, which includes a generally U-shaped core member 9 made of a polycrystalline oxide magnetic material and formed therein with a winding groove 9a, and a corresponding I-shaped core member 10 made of a similar polycrystalline oxide magnetic material and having a metallic magnetic film 11 formed on its one surface confronting the U-shaped core member 9 as shown.

The one surface of the core member 10 to be formed with the metallic magnetic film 11 is preliminarily subjected to etching, and thereafter, formed with said film 11 by a sputtering process employing a sendust alloy as a target. Since the core member 10 is formed by the polycrystalline oxide magnetic material, there are portions readily and not readily subjected to etching, and thus, undulation is formed on said one surface of the core member 10 to provide a rough surface thereat. The U-shaped core member 9 and the I-shaped core member 10 are joined to each other by a bonding glass 12, with a magnetic gap 13 being provided therebetween.

Figure 2:
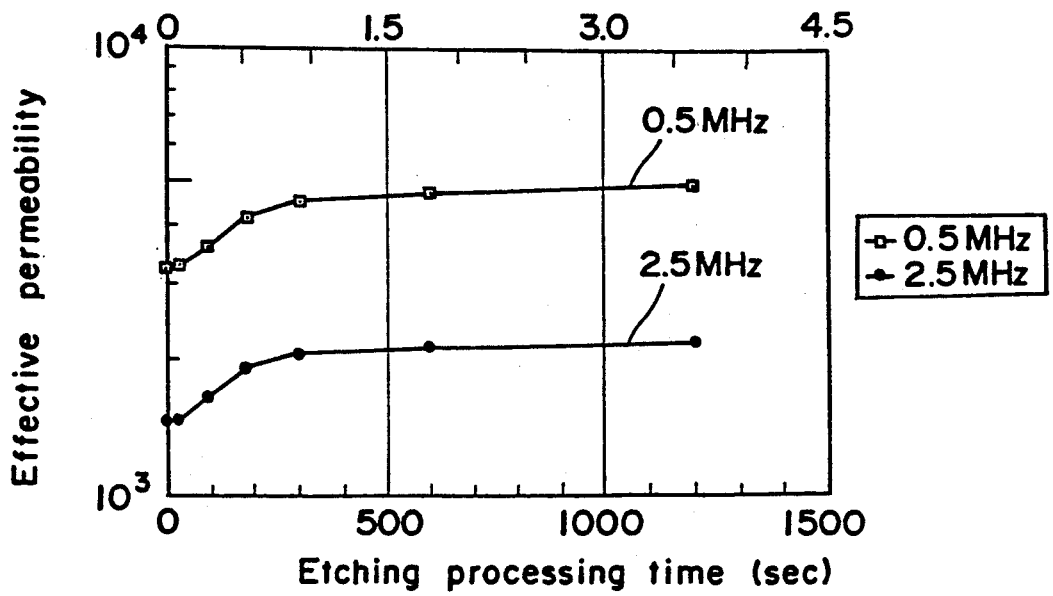
FIG. 2 is a graph showing relation between an etching amount and effective magnetic permeability of a ferrite material.

Referring also to a graphical diagram of FIG. 2 showing the relation between the etching amount and effective magnetic permeability of a ferrite material, the abscissa represents etching processing time and etching amount, while the ordinate denotes effective permeability of the ferrite material. In the above case, Mn-Zn ferrite magnetic material processed for a mirror finish by phosphoric acid aqueous solution set at a temperature in the range of 55° C. to 65° C. was subjected to the etching. As shown in FIG. 2, although the effective permeability is increased with the increase of the etching amount, it becomes almost constant above one micrometer. As described above, by etching the Mn-Zn ferrite magnetic material processed for the mirror finish with the use of phosphoric acid aqueous solution, the portion changed into a non-magnetic material by the mirror finish, i.e., the processing-affected layer can be removed for the improvement of the effective permeability.

Figure 3:
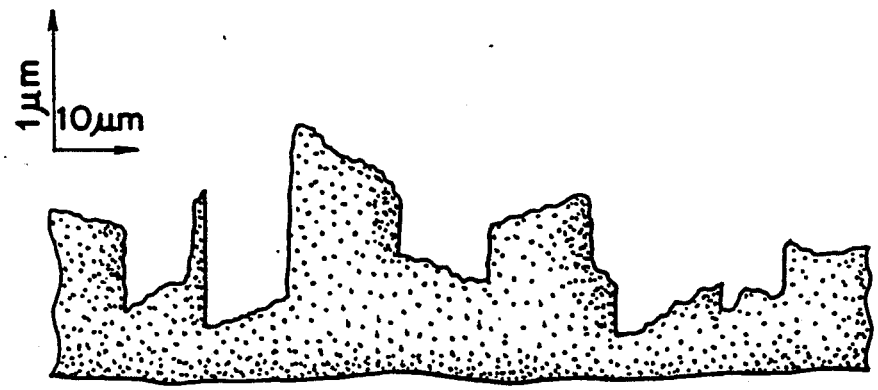
FIG. 3 is a fragmentary sectional view of a core member showing the state of its surface when etching is effected.
Figure 4:
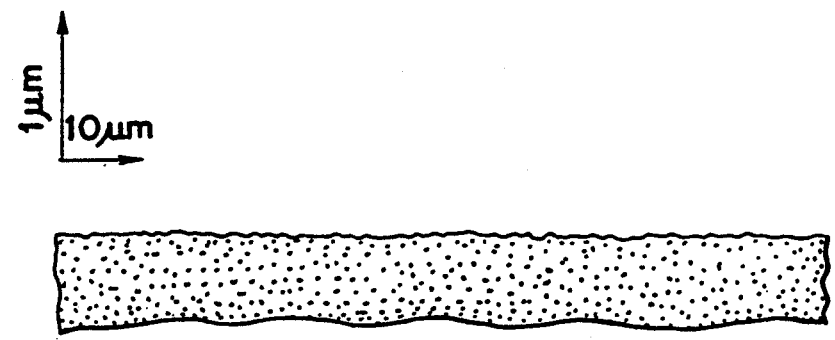
FIG. 4 is a view similar to FIG. 3, which particularly shows the state of the surface of a core member when etching is not effected.

FIG. 3 shows a fragmentary cross section in the vicinity of the surface of Mn-Zn ferrite magnetic material when the Mn-Zn ferrite magnetic material processed for the mirror finish by the phosphoric acid aqueous solution set at 55° C. to 65° C. is processed for etching. In this case, the etching processing was effected for 500 seconds. Meanwhile, FIG. 4 shows a similar fragmentary cross section in the vicinity of the surface of a Mn-Zn ferrite magnetic material before the etching processing. Upon comparison of FIG. 3 with FIG. 4, it is seen that a roughened surface having a difference of about one micrometer between the concave portion and convex portion is formed on the Mn-Zn ferrite magnetic material.

Figure 5:
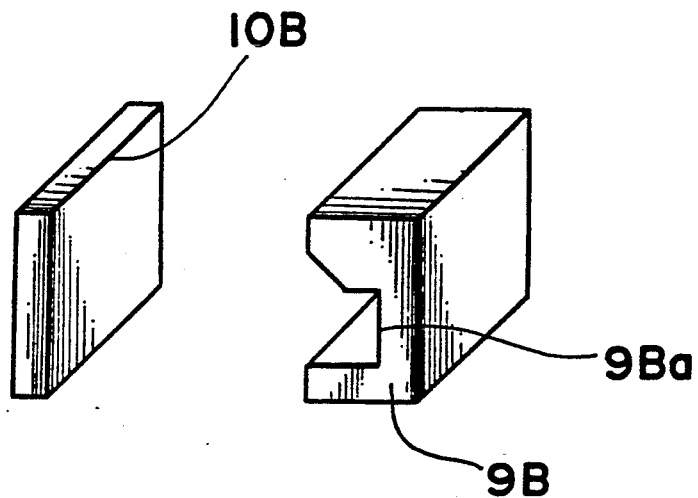
FIGS. 5 to 7 are perspective views for explaining a method of manufacturing a magnetic head according to the present invention.
Figure 6:
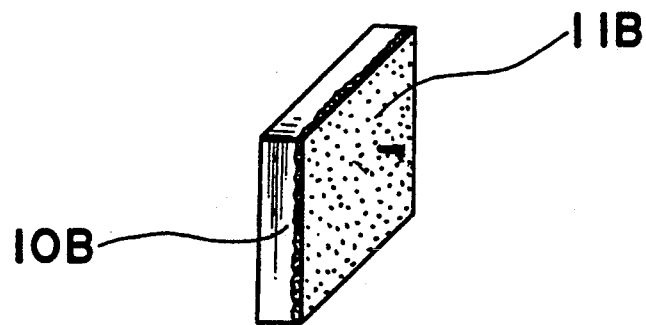
Figure 7:
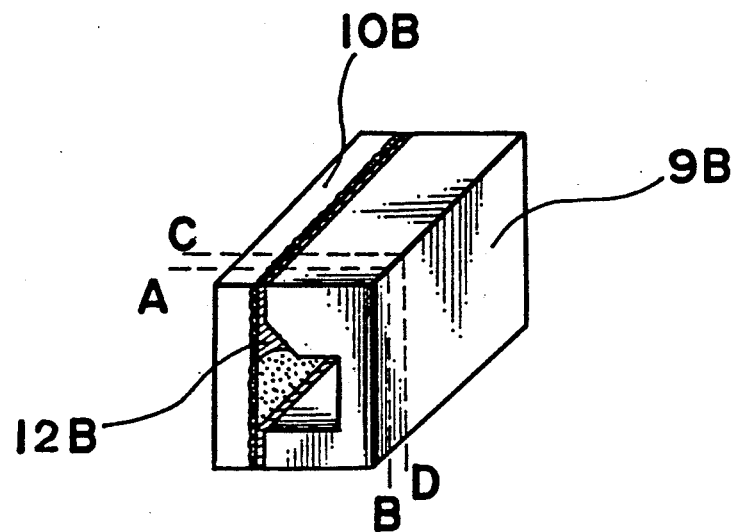

With respect to the magnetic head having the construction as described so far, a manufacturing method thereof will be explained hereinafter with reference to FIGS. 5 to 7.

First, a magnetic core block 10B having a generally I-shaped cross section and made of a polycrystalline oxide magnetic material, and another magnetic core block 9B having a generally U-shaped cross section and made of the similar polycrystalline oxide magnetic material are prepared. The magnetic core block 9B is formed with a winding groove or recess 9Ba. Subsequently, as shown in FIG. 6, one surface of the magnetic core block 10B is subjected to the etching processing for 500 seconds by a phosphoric acid aqueous solution at 600° C. for roughening to provide a difference of about one micrometer between convex portions and concave portions. Thereafter, a metallic magnetic film 11B is formed on said one surface by sputtering of a soft magnetic alloy of Fe-Si-Al, and the metallic magnetic film 11B is processed for the mirror finish. Then, the magnetic core blocks 9B and 10B are abutted to each other so that the metallic magnetic film 11B confronts the corresponding surface of the magnetic block 9B. Subsequently, as shown in FIG. 7, the magnetic blocks 10B and 9B are bonded to each other by a bonding glass 12B through a glass material or the like which serves as a filling material for the magnetic gap. Finally, the magnetic blocks 10B and 9B thus bonded to each other are cut off in planes including dotted lines A-B, C-D and so forth to form core chips as shown in FIG. 1, with sliders (not particularly shown) being attached to opposite side faces of the core chip to form the magnetic head.

Figure 8:
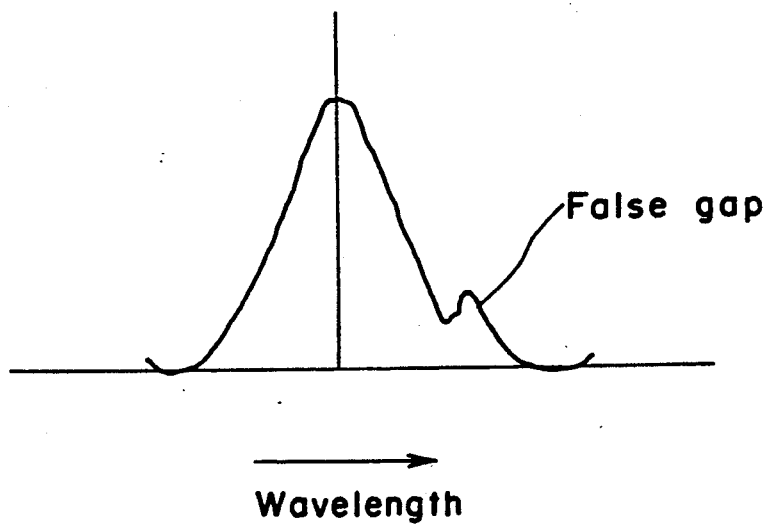
FIG. 8 is a graphical diagram showing a solitary wave response waveform formed by conventional magnetic head.
Figure 9:
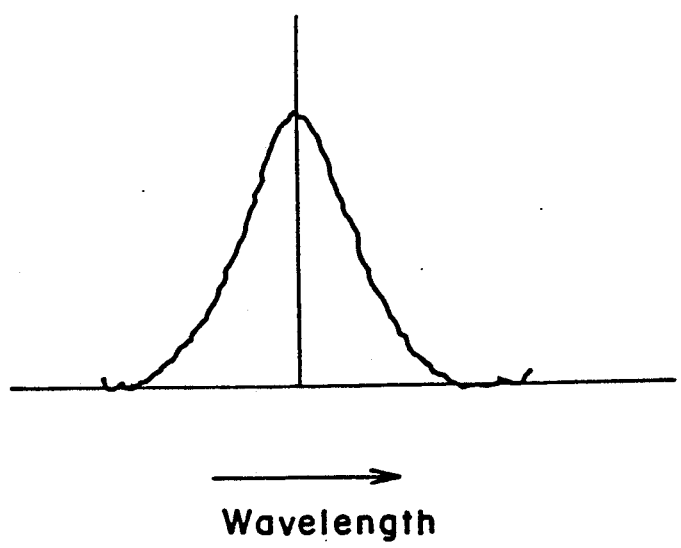
FIG. 9 is a diagram similar to FIG. 8, which particularly shows a solitary wave response waveform formed by a magnetic head of the present invention.
Figure 10:
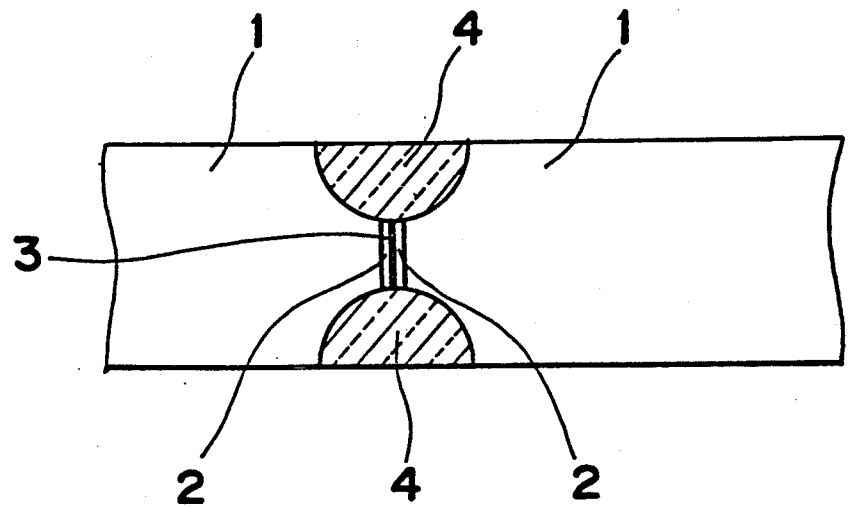
FIG. 10 is a fragmentary top plan view for explaining construction of a conventional magnetic head (already referred to)
Figure 11:
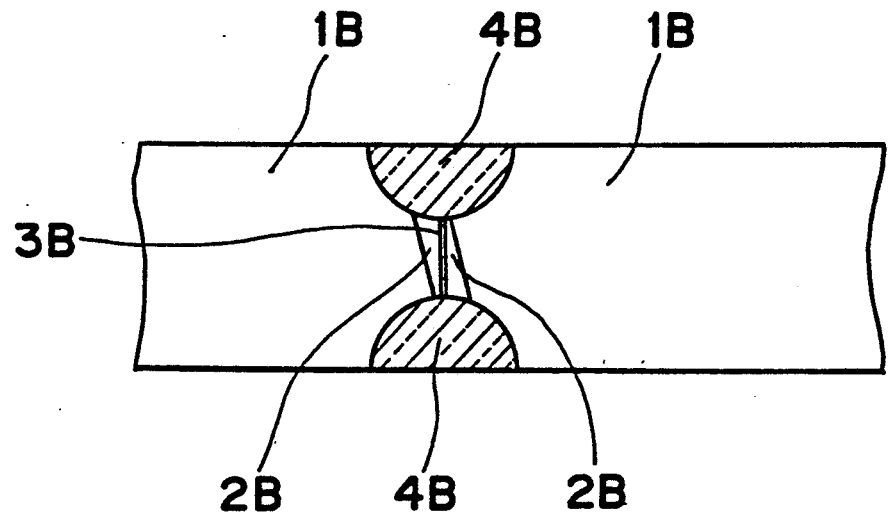
FIG. 11 is a view similar to FIG. 10, which particularly shows another example of a conventional magnetic head (already referred to).

FIG. 8 shows a solitary wave response waveform to be formed by a conventional magnetic head, in which a small waveform due to influence of a pseudo gap is observed at the foot of the main waveform. Meanwhile, FIG. 9 represents a solitary wave response waveform to be formed by a magnetic head according to the present invention, in which almost no waveform due to a pseudo gap is observed.

According to the embodiment of the present invention as described so far, by roughening the surface of the core member 10 to be formed with the metallic magnetic film 11 through the etching process, the junction between the metallic magnetic film 11 and the core member 10 may be made non-parallel with respect to the magnetic gap, without employment of a special manufacturing step so as to prevent generation of a pseudo gap. Moreover, since the processing-affected layer can be removed for improved permeability, magnetic efficiency may also be raised.

It should be noted here that, in the foregoing embodiment, although only one of the core members is roughened on its surface and formed with the metallic magnetic film, both of the core members may be roughened. Meanwhile, the metallic magnetic film may also be formed on the counterpart core member to be attached to the core member roughened on the surface and formed with the metallic magnetic film thereon.

It should also be noted that the chemical etching employing the phosphoric acid aqueous solution described as employed in the foregoing embodiment may be replaced by physical etching process based on ion milling process or the like, and that Fe-Si-Al alloy used as the metallic magnetic film may be replaced by an amorphous soft magnetic alloy or Permalloy of Fe-Ni group, etc.

It should further be noted that in the foregoing embodiment, although the processing-affected layer is entirely removed, generation of the pseudo gap may be fully suppressed if the undulation is formed even when such layer is not completely removed.

As is clear from the foregoing description, according to the method of manufacturing the magnetic head of the present invention, owing to the roughening by etching of the portion of the core member to be formed with the metallic magnetic film, it is possible to make the joining portion between the metallic magnetic film and the core member non-parallel with the magnetic gap, and therefore, generation of a pseudo gap can be suppressed, with a simultaneous improvement of the productivity.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of manufacturing a magnetic head which comprises a first step of etching one surface of a core block formed of a polycrystalline magnetic material to form an irregular nonwave-like pattern of concave and convex portions on said one surface, said irregular nonwave-like pattern having an average depth of about one micrometer or more from the bottom of the concave portions to the crest of the convex portions, a second step of forming a first core member by forming a metallic magnetic film on said one surface, and a third step of joining two core members, at least one of which is said first core member, through a non-magnetic material, thereby forming a magnetic gap therebetween.

2. The method according to claim 1, wherein only one of said joined two core members is a first core member having a metallic magnetic film formed on an etched surface.

3. A method of manufacturing a magnetic head which comprises a first step of subjecting one surface of a core block formed of a polycrystalline magnetic material to chemical etching to form an irregular nonwave-like pattern of concave and convex portions on said one surface, said irregular nonwave-like pattern having an average depth of about one micrometer or more from the bottom of the concave portions to the crest of the convex portions, a second step of forming a first core member by forming a metallic magnetic film on said one surface, and a third step of joining two core members, at least one of which is said first core member, through a non-magnetic material, thereby forming a magnetic gap therebetween.

4. The method according to claim 3, wherein only one of said joined two core members is a first core member having a metallic magnetic film formed on an etched surface.

5. A method of manufacturing a magnetic head which comprises a first step of subjecting one surface of a core block formed of polycrystalline ferrite to etching to form an irregular nonwave-like pattern of concave and convex portions on said one surface, said irregular nonwave-like pattern having an average depth of about one micrometer or more from the bottom of the concave portions to the crest of the convex portions, a second step of forming a first core member by forming a metallic magnetic film on said one surface, and a third step of joining two core members, at least one of which is said first core member, through a non-magnetic material, thereby forming a magnetic gap therebetween.

6. The method according to claim 5, wherein only one of said joined two core members is a first core member having a metallic magnetic film formed on an etched surface.

* * * * *